United States Patent
Chen et al.

(10) Patent No.: US 9,418,196 B2
(45) Date of Patent: Aug. 16, 2016

(54) LAYOUT OPTIMIZATION FOR INTEGRATED CIRCUIT DESIGN

(71) Applicant: Taiwan Semiconductor Manufacturing Company, Ltd., Hsin-Chu (TW)

(72) Inventors: Huang-Yu Chen, Hsin-Chu (TW);
Yuan-Te Hou, Hsin-Chu (TW);
Yu-Hsiang Kao, Hsin-Chu (TW);
Ken-Hsien Hsieh, Hsin-Chu (TW);
Ru-Gun Liu, Hsin-Chu (TW);
Lee-Chung Lu, Hsin-Chu (TW)

(73) Assignee: TAIWAN SEMICONDUCTOR MANUFACTURING COMPANY, LTD., Hsin-Chu (TW)

( * ) Notice: Subject to any disclaimer, the term of this patent is extended or adjusted under 35 U.S.C. 154(b) by 0 days.

(21) Appl. No.: 14/598,773

(22) Filed: Jan. 16, 2015

(65) Prior Publication Data

US 2015/0199469 A1    Jul. 16, 2015

Related U.S. Application Data

(60) Continuation-in-part of application No. 14/552,095, filed on Nov. 24, 2014, now Pat. No. 9,292,645, which is a division of application No. 13/941,941, filed on Jul. 15, 2013, now Pat. No. 8,898,600.

(60) Provisional application No. 61/794,037, filed on Mar. 15, 2013.

(51) Int. Cl.
*G06F 17/50* (2006.01)
*G03F 7/00* (2006.01)

(52) U.S. Cl.
CPC .......... *G06F 17/5081* (2013.01); *G03F 7/0035* (2013.01); *G06F 17/5068* (2013.01); *G06F 17/5072* (2013.01); *G06F 2217/08* (2013.01); *G06F 2217/12* (2013.01); *Y02P 90/265* (2015.11)

(58) Field of Classification Search
USPC .................... 320/50, 51, 52, 53, 54
See application file for complete search history.

(56) References Cited

U.S. PATENT DOCUMENTS

| | | | |
|---|---|---|---|
| 5,619,420 A | 4/1997 | Bried | |
| 7,761,824 B2 * | 7/2010 | Chew et al. | 716/106 |
| 8,146,025 B2 * | 3/2012 | Yang et al. | 716/52 |
| 8,151,234 B2 * | 4/2012 | Berkens et al. | 716/119 |
| 8,176,445 B1 * | 5/2012 | Qian | 716/52 |
| 8,196,068 B2 * | 6/2012 | Zhang | 716/53 |
| 8,516,406 B1 * | 8/2013 | Lai et al. | 716/54 |
| 8,898,600 B2 | 11/2014 | Chen | |
| 2006/0121715 A1 * | 6/2006 | Chang et al. | 438/599 |
| 2008/0222587 A1 * | 9/2008 | Smayling et al. | 716/7 |
| 2008/0301623 A1 * | 12/2008 | Tsai et al. | 716/21 |
| 2010/0050149 A1 * | 2/2010 | Cote et al. | 716/21 |
| 2011/0185329 A1 * | 7/2011 | Wen et al. | 716/130 |
| 2013/0246981 A1 * | 9/2013 | Chiang et al. | 716/53 |
| 2013/0322736 A1 * | 12/2013 | Yu et al. | 382/149 |
| 2014/0001564 A1 * | 1/2014 | Song et al. | 257/369 |
| 2014/0215421 A1 * | 7/2014 | Chen et al. | 716/112 |
| 2014/0264899 A1 * | 9/2014 | Chang et al. | 257/773 |
| 2014/0282306 A1 | 9/2014 | Chen | |

* cited by examiner

*Primary Examiner* — Brian Ngo
(74) *Attorney, Agent, or Firm* — Haynes and Boone, LLP

(57) ABSTRACT

A method includes receiving a target pattern that is defined by a main pattern, a first cut pattern, and a second cut pattern, with a computing system, checking the target pattern for compliance with a first constraint, the first constraint associated with the first cut pattern, with the computing system, checking the target pattern for compliance with a second constraint, the second constraint associated with the second cut pattern, and with the computing system, modifying the pattern in response to determining that a violation of either the first constraint or the second constraint is found during the checking.

20 Claims, 9 Drawing Sheets

LAYOUT OPTIMIZATION FOR INTEGRATED CIRCUIT DESIGN

This application is a continuation in part of U.S. application Ser. No. 14/552,095, filed Nov. 24, 2014, which is a divisional of U.S. application Ser. No. 13/941,941 filed Jul. 15, 2013, and entitled "Layout Optimization for Integrated Circuit Design," which claims the benefit of U.S. Provisional Application No. 61/794,037 entitled "Layout Optimization for Integrated Circuit Design" filed Mar. 15, 2013, both of which are hereby incorporated by reference in their entirety.

BACKGROUND

Multiple patterning is a technique used in photolithographic processes to allow for greater feature density. When fabricating integrated circuits, various features such as metal lines are formed into a semiconductor substrate. To form these features, photo-masks are used to form a pattern into a photo-resist layer. For example, the regions where the photo-resist layer is removed expose the underlying substrate to an etching process used to form trenches where metal is subsequently placed.

As the patterns formed into photo-resist layers become increasingly dense, it becomes difficult to use a single photo-mask to form a pattern in the photo-resist layer because features within the nanometer range are relatively small, as compared to the resolution of a light source to which the photo-resist layer is exposed. Thus, multiple masks may be used to form the features within a pattern. Specifically, each of the multiple masks is used to create different features within the target pattern.

In some cases, a cut pattern is used in association with a main pattern to form a target pattern. The cut pattern removes features formed by the main pattern in order to achieve the desired target pattern. Using such techniques provides certain advantages to the photolithographic process. For example, it is desirable to have a large process window. The process window refers to a range of focus and exposure settings that will still produce the desired features into the photo-resist layer. A process window can be improved by keeping features within a pattern relatively uniform in density. This may involve placement of "dummy" features in or near the pattern. Dummy features are extra features that are placed in order to maintain feature density, but may not serve any function within the circuit for which the pattern is designed. To separate dummy features from real features and to create the desired pattern, a cut mask is used.

Placement of the cut features within the cut feature mask is an important consideration. If two cut features are too close to each other, then it can be difficult to form the cut features properly. Moreover, the cut features may adversely affect adjacent features. Thus, it is beneficial to consider the placement of cut features when designing a layout for a target pattern.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of the disclosure. Specific examples of components and arrangements are described below to simplify the present disclosure. These are, of course, merely examples and are not intended to be limiting. Moreover, the performance of a first process before a second process in the description that follows may include embodiments in which the second process is performed immediately after the first process, and may also include embodiments in which additional processes may be performed between the first and second processes. Various features may be arbitrarily drawn in different scales for the sake of simplicity and clarity. Furthermore, the formation of a first feature over or on a second feature in the description that follows may include embodiments in which the first and second features are formed in direct contact, and may also include embodiments in which additional features may be formed between the first and second features, such that the first and second features may not be in direct contact.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Figure 1:
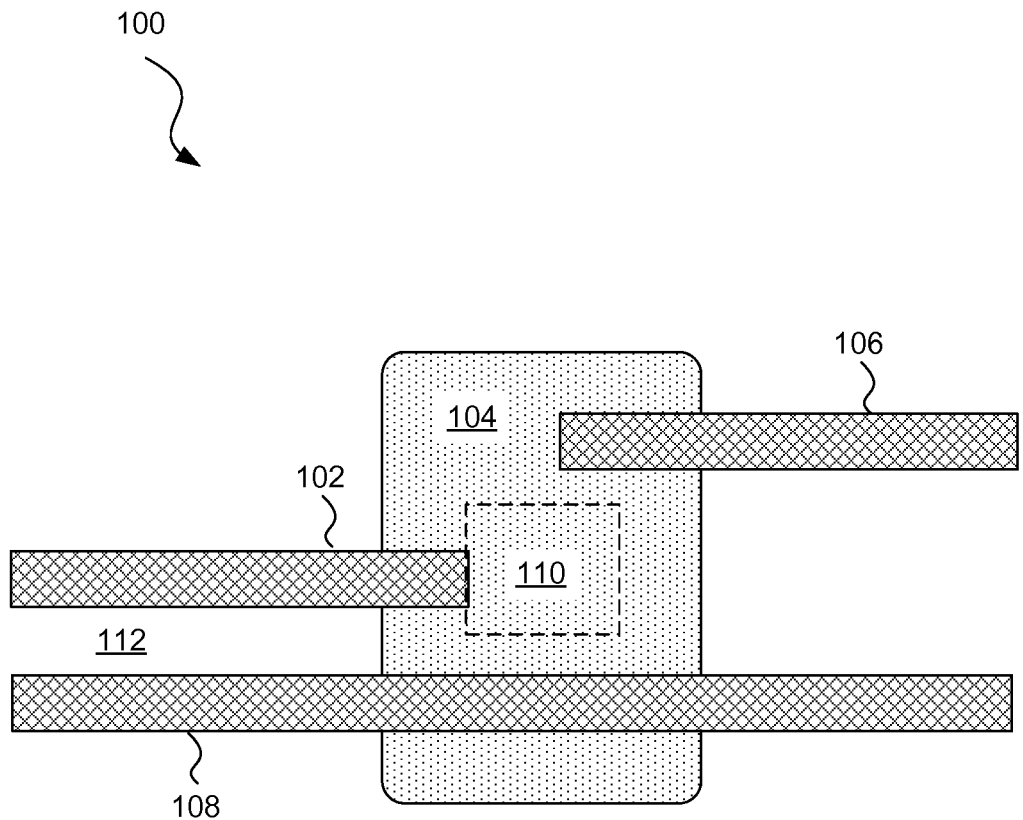
FIG. 1 is a diagram showing an illustrative keep-out zone assigned to a cut feature, according to one example of principles described herein.

FIG. 1 is a diagram showing an example target pattern 100 for an integrated circuit (IC) layout. The target pattern 100 includes a number of target features 102, 106, 108. The target features may be, for example, metal lines. Because the target pattern will use a combination of a main pattern and a cut pattern, it is presumed that ends of the features will be formed by a cut feature 110.

The diagram also shows a keep-out zone 104 that is associated with the end of the feature 102. The keep-out zone 104 places limits on nearby features. Specifically, the feature 106 is not "allowed" to end within the keep-out zone 104. The keep-out zone 104 does, however, allow a feature 108 to pass through, as long as that feature 108 does not have an end within the keep-out zone 104. This is because ends of other features will presumably be formed with a cut feature. Thus, to allow an end within the keep-out zone 104 will potentially allow two cut features to be formed too close to each other.

The main pattern and cut pattern may be formed in a variety of methods. In one example, the main pattern is formed into a photo-resist layer by exposing the photo-resist layer to a light source through a photo-mask. In one example, the photo-resist material may be a negative photo-resist material. In such a material, the regions exposed to light become insoluble to the photo-resist developer. The photo-resist material where features are to be formed should become soluble to a developing solution and thus the photo-mask blocks such regions from exposure. The insoluble regions of the photo-resist material remain to protect the underlying layer from an etching process used to form the features into the underlying layer.

As mentioned above, a main pattern may be subject to restricted design rules. These restricted design rules may be a variety of constraints that take into consideration the overall density of the pattern. For example, a restricted design rule layout may require the pattern to consist of a series of target features in parallel, and a set distance apart from each other. In order to create the final circuit from these features, a cut feature mask is used to expose cut features into the pattern that cut up the main features. Cutting the main features separates real features from the dummy features. Real features are those that serve a function in the circuit to be created by the pattern. For example, if the features are metal lines, then real features may carry electrical signals. In some examples, cutting the main features generates features with improved line ends.

When using a negative photo-resist, the cut mask may expose regions that have not yet been exposed. Thus, the main mask exposes all the regions around the intended main features to the light source in order to make those regions 112 insoluble. Likewise, the cut feature mask exposes regions of the photo-resist layer that are to become insoluble, and thus "cuts" the target features formed by the target feature mask.

In another example, a first photo-resist layer is used to expose an underlying hard mask material to an etching process that forms the main features. A second photo-resist layer is then used to form the cut features into the hard mask. The hard mask then represents the target pattern that can be transferred to the underlying substrate. In some examples, the cut features may be formed before the main features and more than one hard mask material may be used.

As mentioned above, it is important that the cut features within the cut mask follow certain rules. For example, the cut features should not be too close to each other. Thus, when designing a target pattern and a corresponding main pattern and cut pattern, it is important to take those rules into account. This is done by defining a keep-out zone for each cut feature that "keeps out" only ends of other target features. The keep-out zone keeps out other feature ends because presumably other feature ends are created through use of another cut feature. Thus, by keeping other feature ends out of the keep-out zone, it can be ensured that no other cut features come close to another cut feature. By being concerned with feature ends and not features altogether, the keep-out zones 104 allow features 108 to pass through as long as those features 108 do not "stop" within the keep-out zone.

In the example of FIG. 1, one feature 106 does not meet the keep-out zone rule. Specifically, the feature 106 ends in the keep-out zone. If this situation occurs during the pattern layout, then the layout is adjusted in order to avoid such a keep-out zone violation.

Figure 2A:
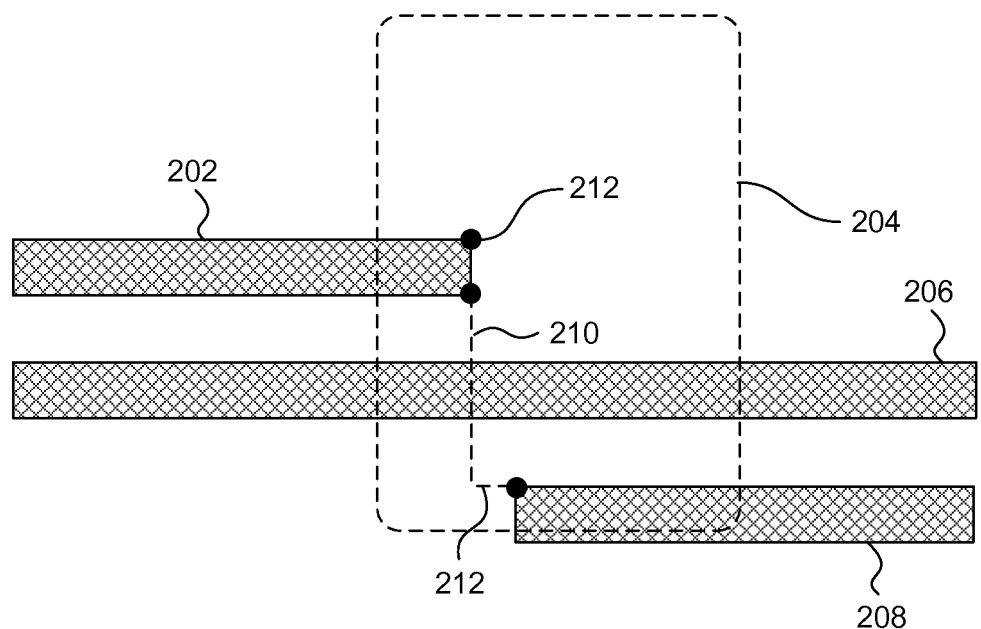
FIG. 2A is a diagram showing an illustrative method of using corners to determine whether features end within the keep-out zone, according to one example of principles described herein.

FIG. 2A is a diagram showing an illustrative method of using corners to determine whether features 202, 206, and/or 208 end within a keep-out zone 204. During the layout of a target pattern, various mechanisms by which to determine if a feature violates a keep-out zone rule may be used. In one example, corners 212 of the features can be used to determine if a feature violates the keep-out zone 204.

In the case where the keep-out zone is substantially rectangular in shape, such as is shown in FIG. 2A, it can be determined if a feature violates the keep-out zone 204 by the distance between corners 212. Specifically, the distance between a first feature 202 associated with the keep-out zone 204 and the corner of another feature 208 can be measured. Both the vertical distance 210 and the horizontal distance 212 can be used to determine whether the second feature 208 is within the keep-out zone 204. In the example of FIG. 2A, the corner of the second feature 208 is within the keep-out zone 204. Thus, such a layout would have to be adjusted in order to comply with the keep-out zone rules. The intermediate feature 206, however, does not have an end within the keep-out zone and is not problematic.

Figure 2B:
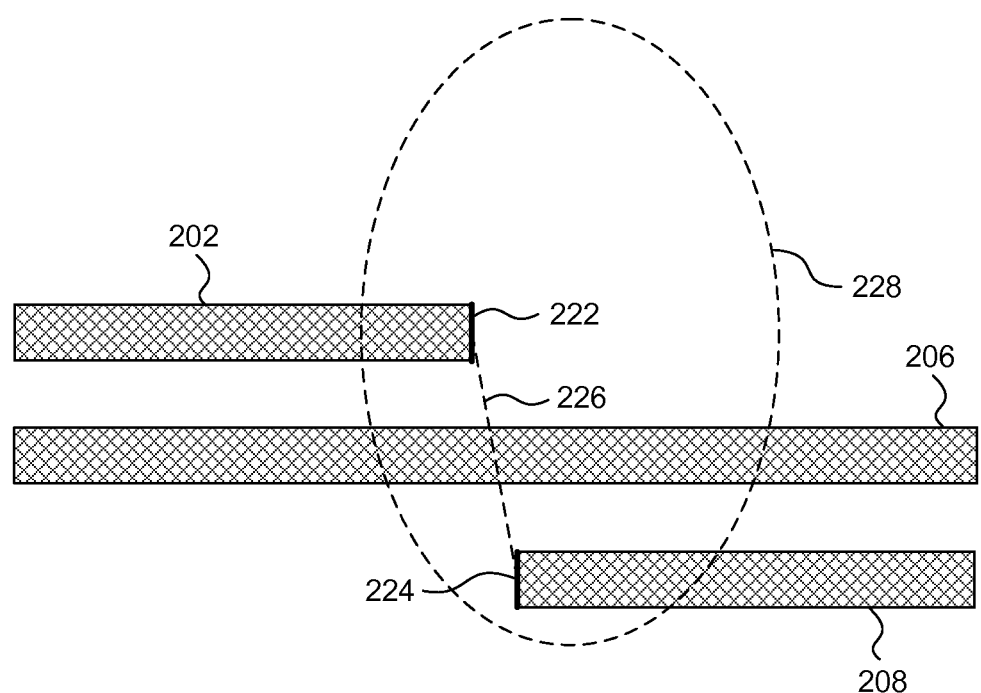
FIG. 2B is a diagram showing an illustrative method of using edges to determine whether features end within the keep-out zone, according to one example of principles described herein.

FIG. 2B is a diagram showing an illustrative method of using edges to determine whether features end within the keep-out zone 228. In this example, the keep-out zone 228 is elliptically shaped. In some examples, however, the keep-out zone may be square, rectangular, or circular.

To determine whether any features end within the keep-out zone, an edge-to-edge distance may be measured. Using the direction and distance 226 from the edge 222 of the first feature 202 and the edge 224 of the second feature 208, it can be determined whether the end of the second feature 208 ends within the keep-out zone 228. The distance may be from the center of one edge 222 to the center of the other edge 224.

The examples given above for determining whether a feature ends within a keep-out zone are only a few methods that may be used. Various other mechanisms for determining whether a feature is in violation of a keep-out zone may be used. Moreover, an actual layout will have several keep-out zones.

In some examples, a keep-out zone is associated with every feature where it is intended to be cut by a cut feature. It may be the case that several iterations of adjustments occur during the layout phase in order to have a layout in which no feature ends are positioned within keep-out zones. In some cases, the layout may be designed feature-by-feature and thus each newly placed feature will be placed in a manner so as to avoid having edges within a keep-out zone.

Figure 3A:
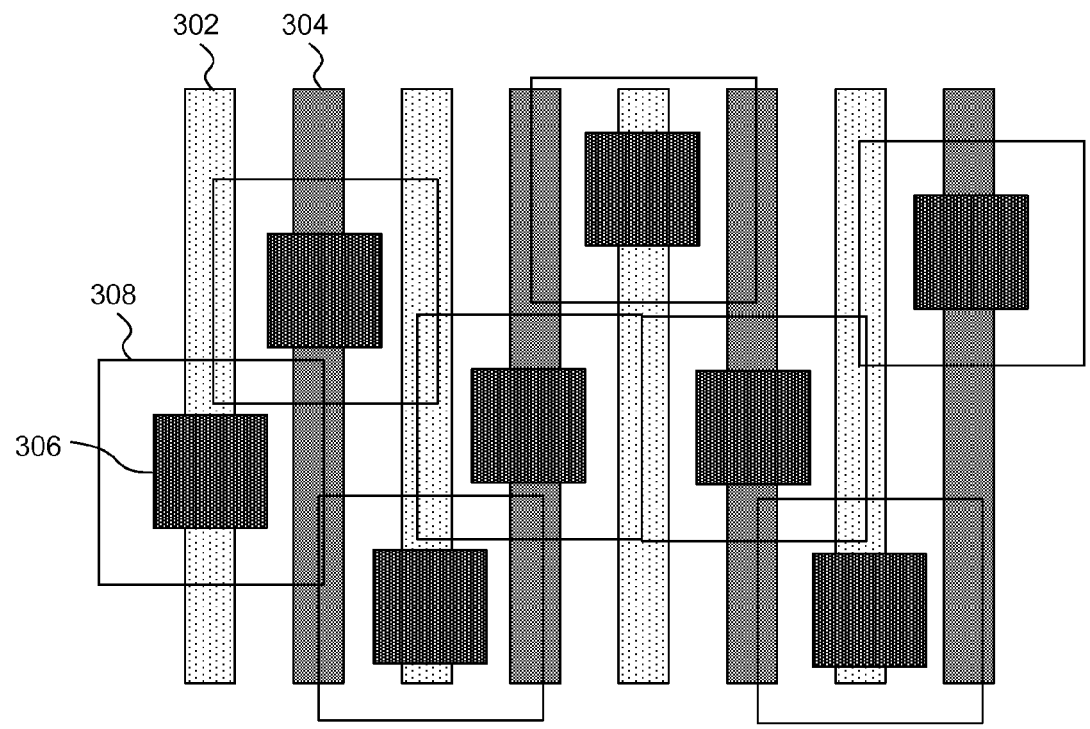
FIG. 3A is a diagram showing an illustrative cut pattern over a main pattern, according to one example of principles described herein.

FIG. 3A is a diagram showing an illustrative cut pattern over a main pattern. The main pattern is designed to be process efficient. Specifically, the main pattern is designed to have a larger process window by adding extra features to maintain a uniform density. The cut pattern, however, is designed to use cut features 306 so that when overlain with the main pattern, creates the target pattern. As mentioned above, it is desirable that the cut features be not too close together. Thus, a keep out zone 308 is associated with each feature end.

The keep-out zones 308 are designed with consideration of the cut features that will be used to form those line ends. Specifically, the keep-out zones may be centered on where the cut features are to be placed. The placement of the cut features can be determined by the feature ends.

In some examples, the main pattern can be formed using multiple patterning techniques. For example, some features 302 may be formed with a first mask while other features 304 may be formed with a second mask. Various techniques which use multiple masks to form the main pattern may be used. Such techniques include, but are not limited to, multiple patterning, self-aligned multiple patterning and self-directed assembly.

Figure 3B:
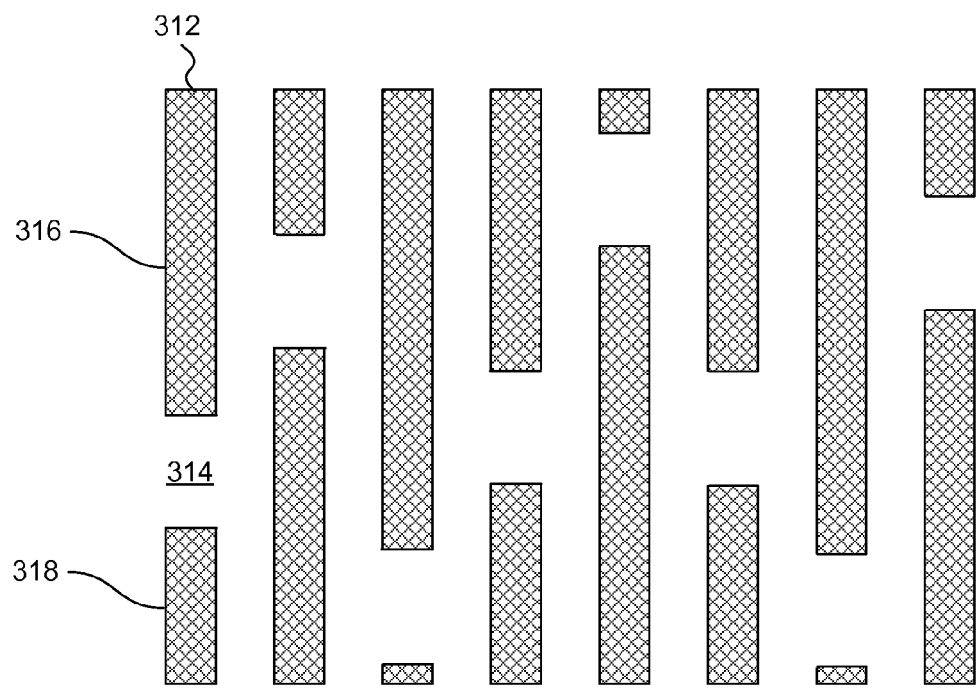
FIG. 3B is a diagram showing an illustrative target pattern formed from the main pattern and cut pattern, according to one example of principles described herein.

FIG. 3B is a diagram showing an illustrative target pattern formed from the main pattern and cut pattern. If the target pattern is designed appropriately with the keep-out zones associated with the ends of the real features, then the cut pattern will be designed appropriately without the cut features being too close together. Moreover, the desired function of the target pattern will still be present within the final pattern. The target pattern includes spaces 314 that are to be formed with cut features. A space 314 may separate a real feature 316 from a dummy feature 318.

Figure 4:
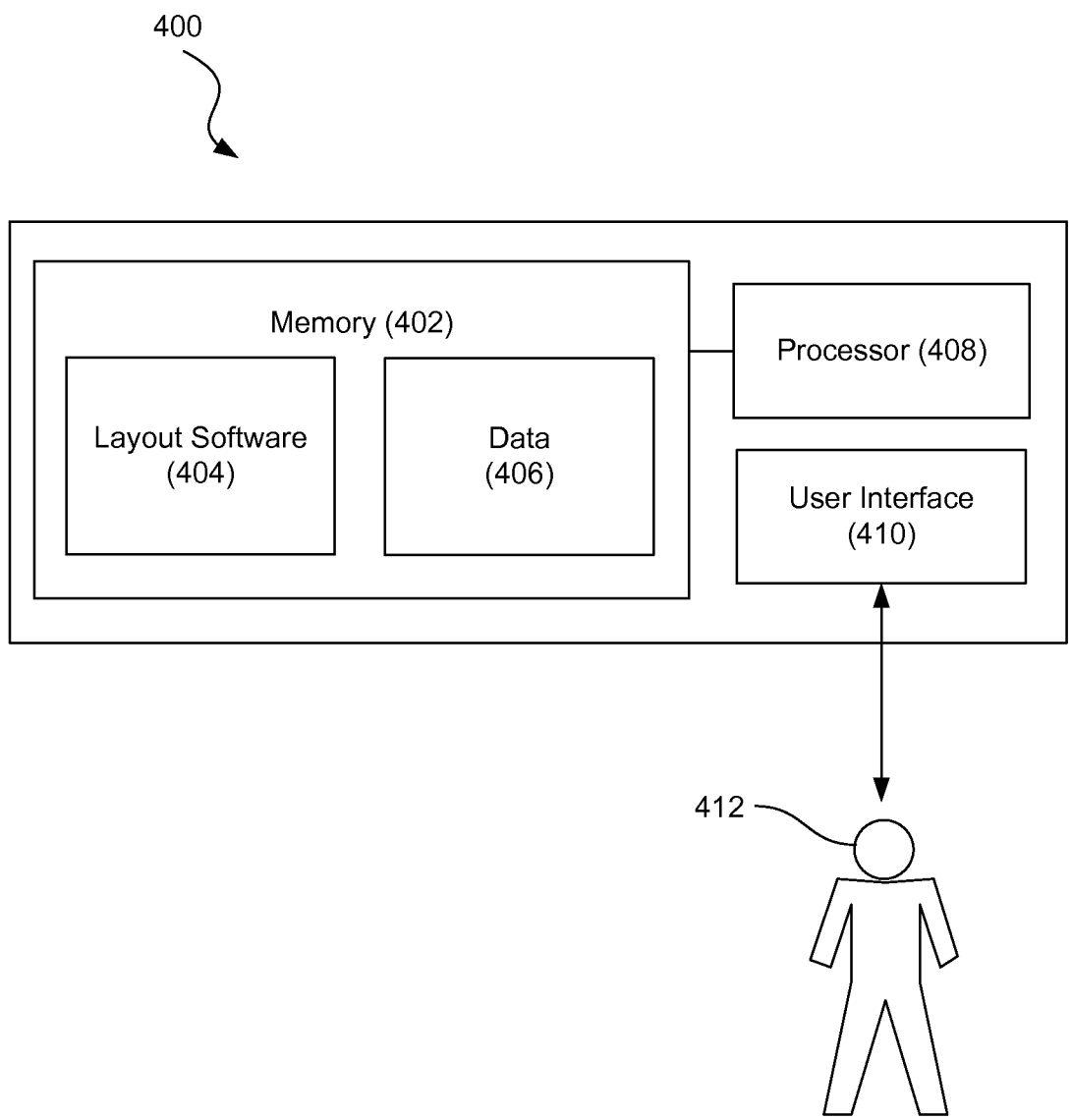
FIG. 4 is a diagram showing an illustrative computing system for laying out patterns, according to one example of principles described herein.

FIG. 4 is a diagram showing an illustrative computing system for laying out patterns. According to certain illustrative examples, the physical computing system 400 includes a memory 402 having layout software 404 and data 406 stored thereon. The physical computing system 400 also includes a processor 408 and a user interface 410.

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software 404 and data 406.

The physical computing system 400 also includes a processor 408 for executing the software 404 and using or updating the data 406 stored in memory 402. In addition to storing the layout software 404, the memory 402 may store an operating system. An operating system allows other applications to interact properly with the hardware of the physical computing system. The layout software 404 may include the tools to form final pattern layouts as well as main pattern layouts and cut pattern layouts. For example, the layout software 404 may have the tools to check a pattern, modify a pattern, or decompose a pattern. The data 406 may include design constraints.

A user interface 410 may provide a means for a user 412 to interact with the system. The user may use various tools such as a keyboard or a mouse to input information into the physical computing system. Additionally, various output devices such as a monitor may be used to provide information to the user 412.

Figure 5:
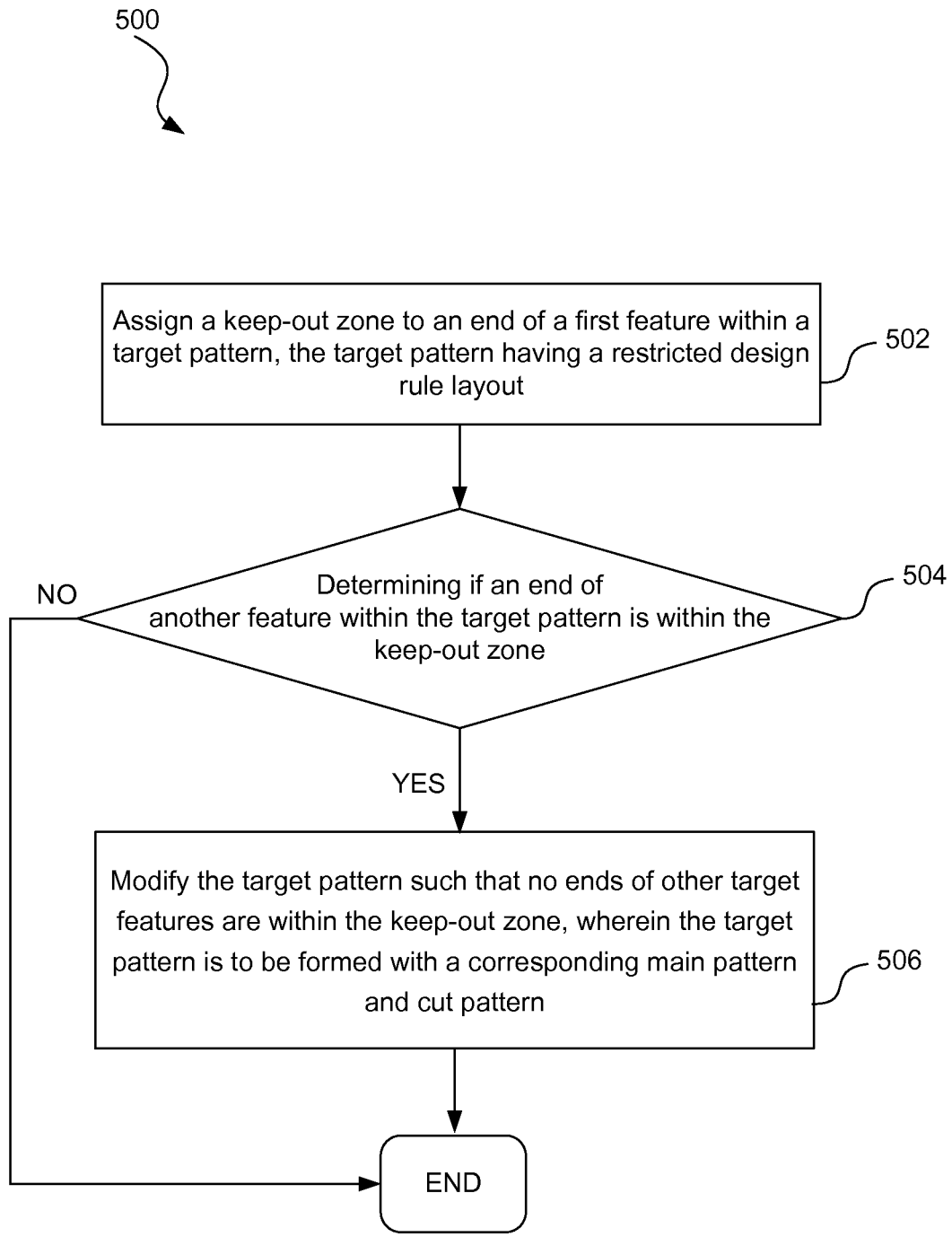
FIG. 5 is a flowchart showing an illustrative method for adjusting a pattern layout so that feature ends are not positioned within keep-out zones, according to one example of principles described herein.

FIG. 5 is a flowchart showing an illustrative method for adjusting a pattern layout so that feature ends are not positioned within keep-out zones. The method includes a step for assigning 502 a keep-out zone to an end of a first feature within a target pattern, the target pattern having a restricted design rule layout. The method further includes a step for determining 504 if an end of another feature within the target pattern is within the keep-out zone. If the end of another feature within the target pattern is within the keep-out zone, then the method further includes a step for modifying 506 the target pattern such that no ends of other features are within the keep-out zone. The target pattern is to be formed with a corresponding main pattern and cut pattern. As will be described in further detail below, in some cases a cut pattern can be decomposed into a first cut pattern and a second pattern. In such cases, the modification of the pattern is performed under the condition that the pattern cannot be decomposed without violating a constraint.

Figure 6:
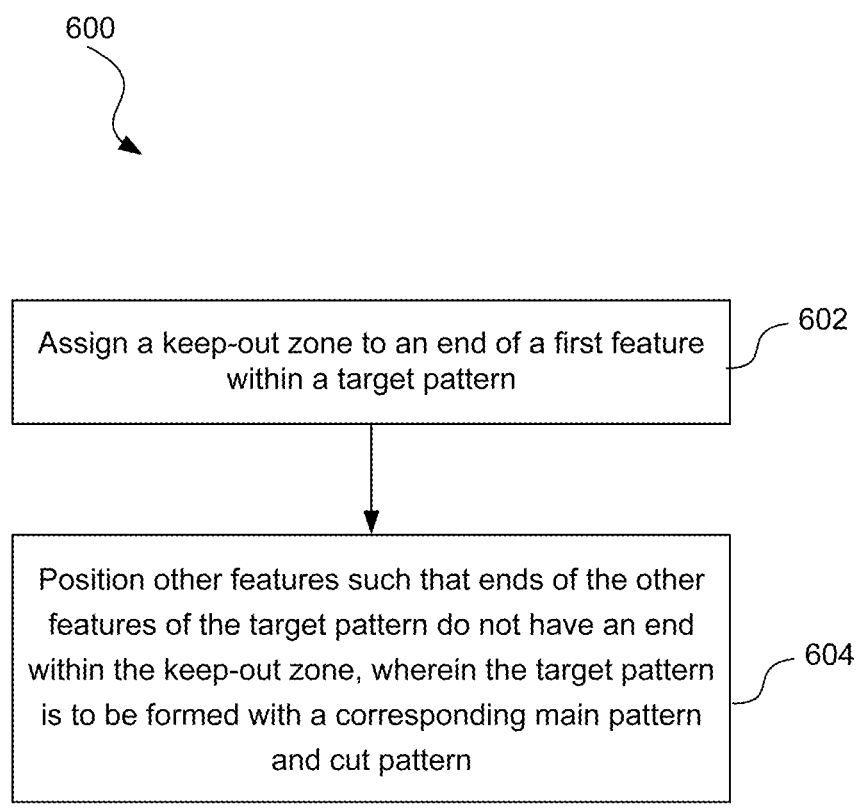
FIG. 6 is a flowchart showing an illustrative method for laying out a pattern so that feature ends are not positioned within keep-out zones, according to one example of principles described herein.

FIG. 6 is a flowchart showing an illustrative method for laying out a pattern so that feature ends are not positioned within keep-out zones. According to certain illustrative examples, the method 600 includes a step for assigning 602 a keep-out zone to an end of a first feature within a target pattern. The method further includes a step for positioning 604 other features such that ends of the other features of the target pattern do not have an end within the keep-out zone. The target pattern is to be formed with a corresponding main feature and cut pattern.

Figure 7A:
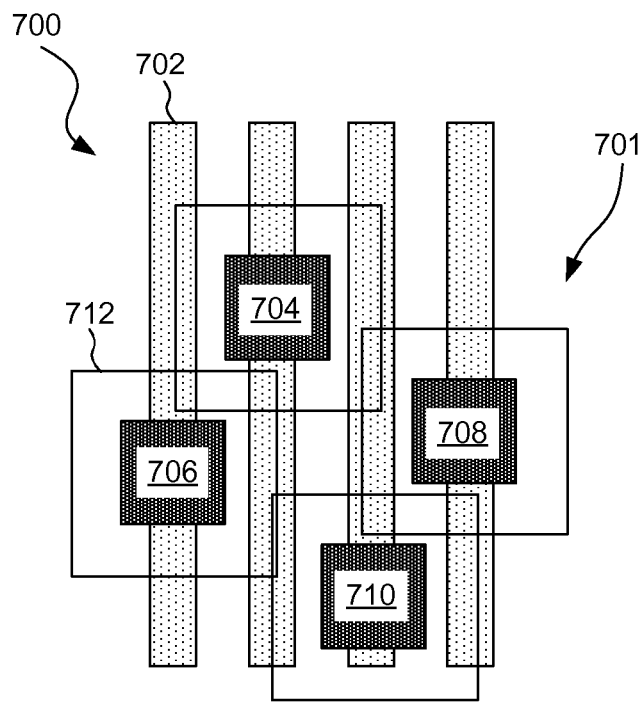
FIGS. 7A-7C are diagrams showing placement of cut features on different cut feature masks, according to one example of principles described herein.
Figure 7B:
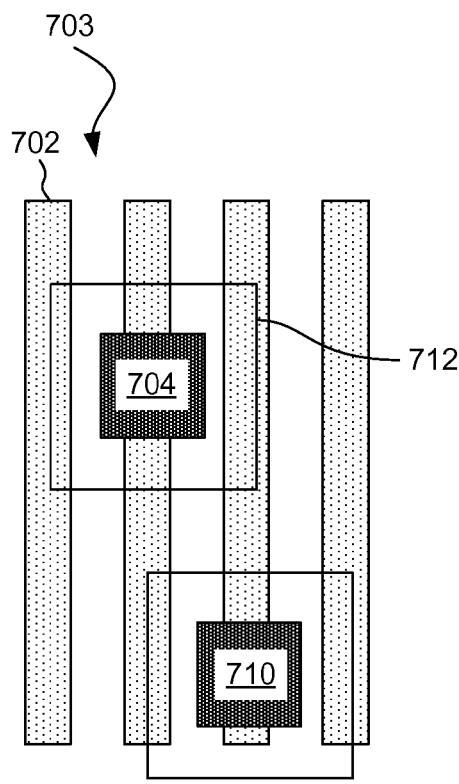
Figure 7C:
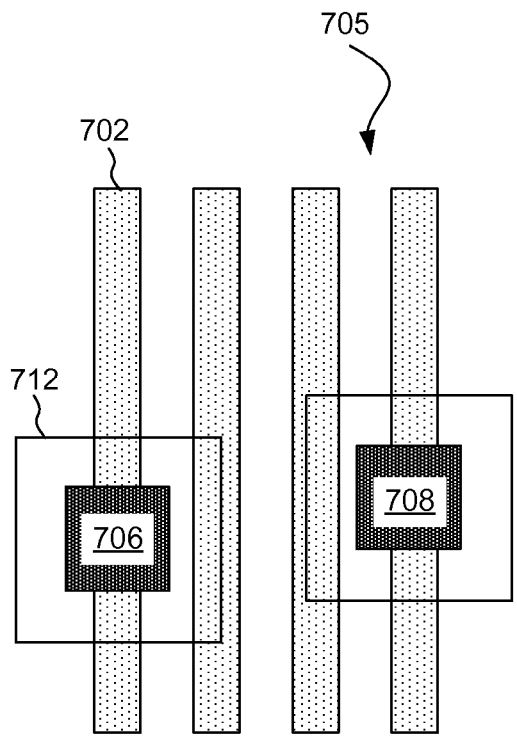

FIGS. 7A-7C are diagrams showing placement of cut features on different cut feature masks. As described above, the main pattern may be formed by one or more masks. In such cases, the main features are assigned to one of the plurality of masks used to create the full main pattern. Additionally, the cut pattern may be formed with multiple masks. Thus, the cut features within the cut pattern can be assigned to one of the plurality of masks that form the full cut pattern. The assignment of cut features to a specific mask can be done according to design constraints. Such design constraints may be provided by the fabrication entity that is to fabricate the integrated circuit based on the target pattern.

FIG. 7A illustrates a main pattern 700 with a set of main features 702. In this example, a single mask is used to create the main pattern. Additionally, the cut features 704, 706, 708, 710 of a cut pattern 701 are used to cut the main features 702 to form a desired target pattern. Each of the cut features 704, 706, 708, 710 is associated with a constraint that limits the placement of that cut feature. For example, each cut feature 704, 706, 708, 710 is associated with a keep-out-zone 712. The keep-out-zone may define a region in which keep-out-zones from other cut features should not overlap. Thus, the cut features 704, 706, 708, 710 can be assigned to a different cut pattern so that there is no overlap of keep-out-zones in each cut pattern. The different cut patterns are associated with different masks.

FIG. 7B illustrates a first cut pattern 703 positioned over the main pattern 700. The first cut pattern 703 includes cut feature 704 and cut feature 710. FIG. 7C illustrates a second cut pattern 705 positioned over the main pattern 700. The second cut pattern includes cut feature 706 and cut feature 708. As illustrated, after the division of the cut pattern 701 into the first cut pattern 703 and second cut pattern 705, there is no cut feature that has a keep-out-zone that overlaps with the keep-out-zone of another cut feature. Thus, the constraints have been met.

The keep-out-zones may be used in other ways. For example, the keep-out-zones 712 may allow some degree of overlap. Specifically, there may be a predetermined threshold value for the amount of area that is allowed for overlap before a constraint is deemed to be violated. In some examples, the number of neighboring cut features that have overlapping keep-out-zones may be kept beneath a minimum. For example, it may be the case that only one cut feature is allowed to have an overlapping keep-out-zone with another feature. In some cases, instead of using a keep-out-zone, the constraint may simply consider the distance between cut features. Specifically, a cut feature may violate the constraint if it is within a specified distance from another cut feature.

In some examples, it may be the case that there is no way to assign all the cut features to a cut pattern without violating a constraint. In such cases, the main pattern and/or cut pattern may be redesigned. Redesigning the cut pattern may involve resizing a cut feature, repositioning a cut feature, or reshaping a cut feature. Redesigning the main pattern may involve adding a dummy feature, extending an existing main feature, or extending an existing dummy feature. Other options for a redesign of the target pattern may be used as well.

Figure 8:
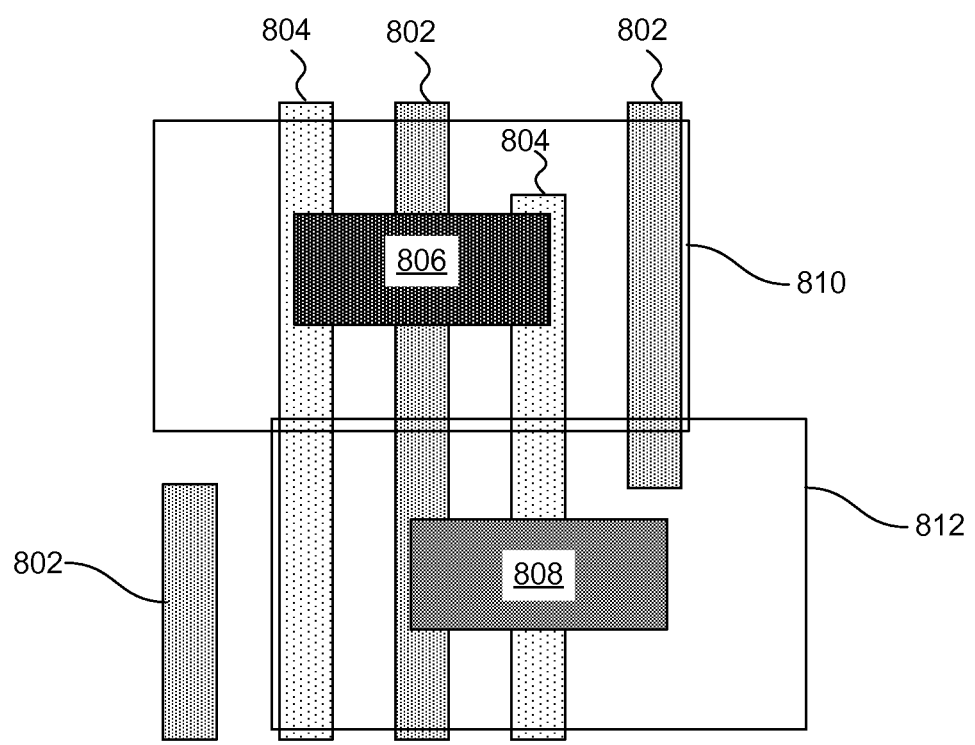
FIG. 8 is a diagram showing illustrative keep-out zones on different cut features masks, according to one example of principles described herein.

FIG. 8 is a diagram showing illustrative keep-out zones on different cut feature masks. In the present example, the main pattern includes a first main pattern with a first set of main features 802 and a second main pattern with a second set of main features 804. Additionally, the cut pattern includes a first cut pattern with a first cut feature 806 and a second cut pattern with a second cut feature 808. Based on the processing techniques used, which are beyond the scope of this disclosure, the cut features 806 of the first cut pattern only affect the first main pattern and do not affect the second main pattern. Conversely, the cut features 808 of the second cut pattern only affect the second main pattern and do not affect the first main pattern. This can be considered when determining if a constraint has been violated.

For example, as described above, one constraint may be that a main feature cannot end within the keep-out-zone but may pass through the keep-out-zone. This can be applied to the example of FIG. 8 with only the main features corresponding to the cut features being considered. For example, for the cut feature 806 of the first cut pattern, there are no main features 802 that have an end within the corresponding keep-out-zone 810. While there is a main feature 804 from the second main pattern that ends within the keep-out-zone 810, this is irrelevant because those main features 804 are not affected by the first cut pattern. Similarly, for the cut feature 808 of the second cut pattern, there are no main features 804 within the second main pattern that end within the corresponding keep-out-zone 812. While there is a main feature 802 from the first main pattern that ends within the keep-out-zone 812, this is irrelevant because the second cut pattern does not affect the first main features 802. Thus, no constraints are violated and no redesign may be performed.

Figure 9:
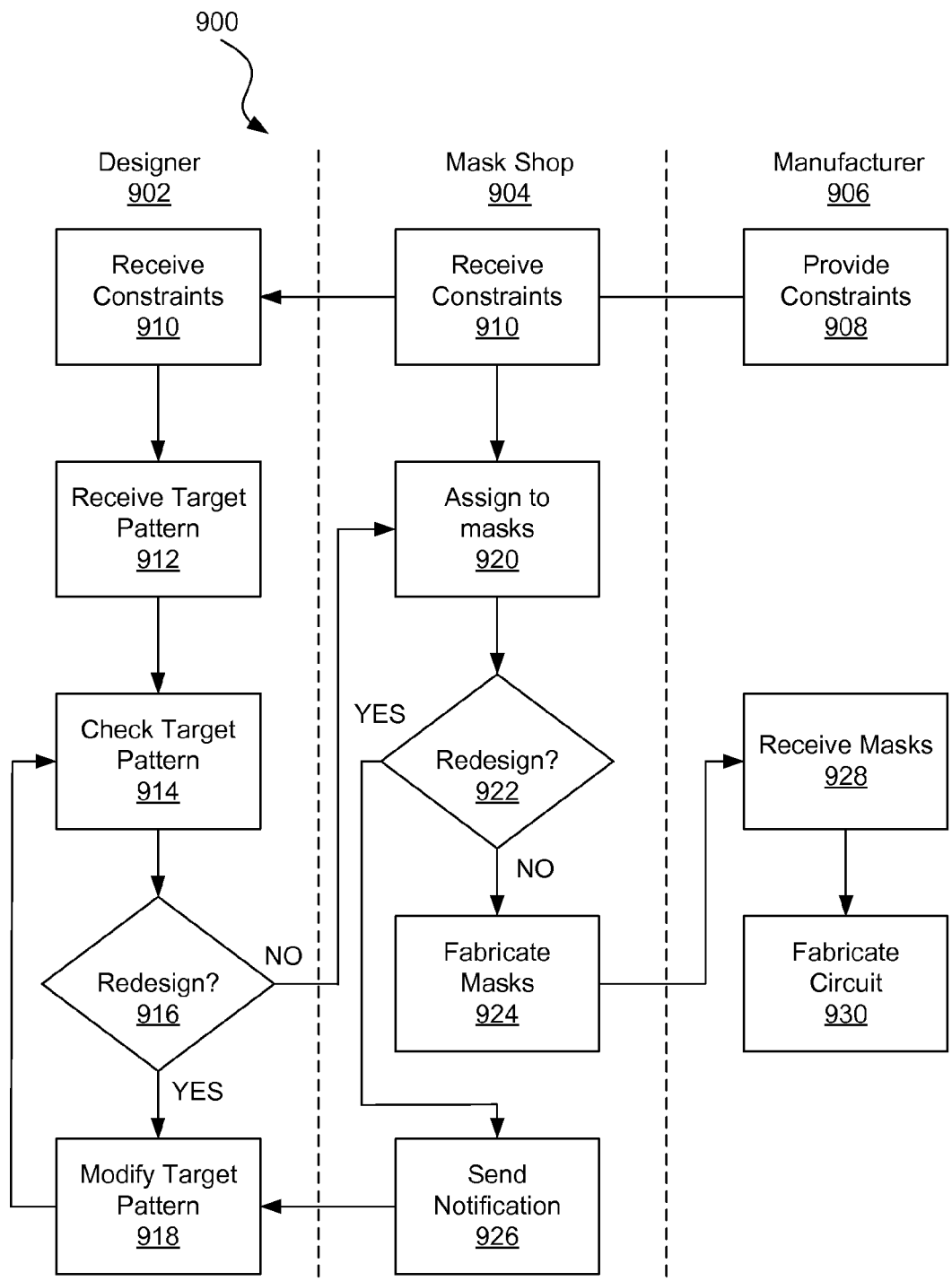
FIG. 9 is a flowchart showing an illustrative method for optimizing the layout of cut features in multiple patterns, according to one example of principles described herein.

FIG. 9 is a flowchart showing an illustrative method 900 for optimizing the layout of cut features in multiple patterns. According to the present example, three entities are involved in the process: the pattern designer 902, the mask shop 904, and the manufacturer 906. In some examples, the entities may be under control of the same organization such as the same corporation. But, in some cases, different organizations may have control of different entities.

The pattern designer 902 generally designs the integrated circuits. This may include the circuit function itself as well as the actual layout. The mask shop 904 is generally responsible for fabricating the masks to be used by the manufacturer 906. The manufacturer 906 is generally responsible for fabricating the integrated circuit based on the pattern provided by the designer 902 and using the mask or masks provided by the mask shop 904.

According to the present example, the method includes a step 908 performed by the manufacturer 906 for providing constraints to both the mask shop and the designer. The constraints may be the constraints described above. For example, the constraints may be associated with a first cut pattern and a second cut pattern. Specifically, the constraints may limit the placement of cut features with respect to corresponding main features. The manufacturer sets such constraints based on the process limitations for the processes that will be used to create an integrated circuit.

At step 910, both the designer 902 and the mask shop 904 receive the constraints provided by the manufacturer 906. At step 912, the designer 902 also receives a target pattern. The target pattern may have been created and provided by an engineer or designer associated with the designer 902. The target pattern can be defined by a main pattern and a plurality of cut patterns. In other words, the target pattern can be designed with the understanding that the features will be fabricated by decomposing the target pattern into a main pattern and a cut pattern. In some cases, the main pattern may be defined by a first main pattern and a second main pattern. That is, it may be understood that the main pattern will be decomposed into a first main pattern and a second cut pattern, each pattern to be formed with a different mask. Additionally, the cut pattern may be defined by a first cut pattern and a second cut pattern. That is, it may be understood that the cut pattern will be decomposed into a first cut pattern and a second cut pattern.

At step 914, the target pattern is checked to determine whether any of the constraints have been violated. In some examples, there may be a first constraint associated with a first cut pattern and a second constraint associated with a second cut pattern. In some examples, the first constraint and second constraint may be the same. In some examples, however, the constraints may be different. A constraint is associated with a cut pattern if the constraint relates to how features will be assigned to that pattern. In other words, the first constraint is associated with the first cut pattern because it relates to limits on the features that will be assigned to that cut pattern.

At step 916, it is determined whether the target pattern should be redesigned. If no constraints are violated, then no redesign is needed at this time and the target pattern can be sent to the mask shop 904. If, however, there are constraints, then the method proceeds to step 918 at which the target pattern is modified. The target pattern may be modified in a variety of ways. For example, the target pattern may be modified so as to cause cut features to be repositioned, resized, or reshaped. The target pattern may also be modified so as to cause the features that are to become main features to be extended or dummy features to be added. After the pattern has been modified, the method returns to step 914 at which the modified target pattern is checked to determine whether any constraints have been violated.

At step 920, the mask shop 904 receives the target pattern and assigns features to various masks. This is where the target pattern is decomposed into the main pattern and the cut pattern, and in some cases further decomposed into a first main pattern, second main pattern, first cut pattern, and second cut pattern. The decomposition is based on the constraints received from the manufacturer. In other words, features of the target pattern are decomposed so as to comply with the constraints.

At step 922, after the decomposition, it is determined if further modification of the target pattern should be applied. This may be the case if the pattern cannot be properly decomposed without violating a constraint. If further modification is to occur then at step 926, the mask shop sends a notification to the designer that the target pattern should be further modified. The method then returns to step 918. If, however, no further modification is to occur, then the various patterns can be formed into the respective masks at step 924, and the masks are provided to the manufacturer 906.

At step 928, the manufacturer receives the masks. Then, at step 930, the manufacturer fabricates the integrated circuit using the masks. Because of the above described process, the integrated circuit can be efficiently fabricated using various fabrication processes.

According to the present example, a method includes receiving a target pattern that is defined by a main pattern, a first cut pattern, and a second cut pattern, with a computing system, checking the target pattern for compliance with a first constraint, the first constraint associated with the first cut pattern, with the computing system, checking the target pattern for compliance with a second constraint, the second constraint associated with the second cut pattern, and with the computing system, modifying the pattern in response to determining that a violation of either the first constraint or the second constraint is found during the checking.

According to one example, a method includes, with a computing system, receiving a target pattern, decomposing the target pattern into a main pattern and an original cut pattern, the original cut pattern comprising a plurality of cut features, with the computing system, associating a constraint with each of the plurality of cut features, and decomposing the original cut pattern into a first cut pattern and a second cut pattern based on the constraint, the first cut pattern associated with a first mask and the second cut pattern associated with a second mask.

According to one example, a method includes receiving a target pattern, receiving a set of constraints, the set of constraints being associated with decomposition of the target pattern into a main pattern, a first cut pattern, and a second cut pattern, with a computing system, checking the target pattern for compliance with a first constraint of the set of constraints, the first constraint associated with the first cut pattern, with the computing system, checking the target pattern for compliance with a second constraint of the set of constraints, the second constraint associated with the second cut pattern, and with the computing system, modifying the pattern in response to determining that a violation of either the first constraint or the second constraint is found during the checking.

It is understood that various different combinations of the above-listed embodiments and steps can be used in various sequences or in parallel, and there is no particular step that is critical or required. Additionally, although the term "electrode" is used herein, it will be recognized that the term includes the concept of an "electrode contact." Furthermore, features illustrated and discussed above with respect to some embodiments can be combined with features illustrated and discussed above with respect to other embodiments. Accordingly, all such modifications are intended to be included within the scope of this invention.

The foregoing has outlined features of several embodiments. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions and alterations herein without departing from the spirit and scope of the present disclosure.

What is claimed is:

1. A method comprising:
   receiving a target pattern that is defined by a main pattern, a first cut pattern, and a second cut pattern;
   with a computing system, checking the target pattern for compliance with a first constraint, the first constraint associated with the first cut pattern and not the second cut pattern;
   with the computing system, checking the target pattern for compliance with a second constraint, the second constraint associated with the second cut pattern and not the first cut pattern;
   with the computing system, modifying the target pattern to create a modified target pattern in response to determining that a violation of either the first constraint or the second constraint is found during the checking; and
   fabricating an integrated circuit associated with the modified target pattern, the fabricating using a first mask associated with the first cut pattern and a second mask associated with the second cut pattern, the first mask being a different mask than the second mask.

2. The method of claim 1, wherein the first constraint is at least one of: distance between adjacent cut features and number of neighbors within a specified distance from a cut feature.

3. The method of claim 1, wherein the first constraint and the second constraint comprise keep-out-zones defining a region surrounding a corresponding cut feature.

4. The method of claim 3, wherein placement of a cut feature is in violation of the first constraint if a main feature has an end within the keep-out-zone associated with the cut feature.

5. The method of claim 3, wherein placement of a cut feature is in violation of the first constraint if the keep-out-zone overlaps with a keep-out-zone associated with an adjacent cut feature.

6. The method of claim 3, wherein a keep-out zone is in a shape of one of: a square, a rectangle, a circle, or an ellipse.

7. The method of claim 1, wherein the modifying comprises one of: repositioning a cut feature, resizing a cut feature, reshaping a cut feature, extending an end of a main feature of the main pattern, or adding a dummy feature to the main pattern.

8. The method of claim 1, wherein the first constraint is different than the second constraint.

9. A method comprising:
   with a computing system, receiving a target pattern;
   decomposing the target pattern into a main pattern and an original cut pattern, the original cut pattern comprising a plurality of cut features;
   with the computing system, associating a constraint with each of the plurality of cut features;
   decomposing the original cut pattern into a first cut pattern and a second cut pattern based on the constraint, the first cut pattern associated with a first mask and the second cut pattern associated with a second mask; and
   fabricating an integrated circuit using the first mask and the second mask, the first mask being different than the second mask.

10. The method of claim 9, wherein the first constraint and the second constraint comprise keep-out-zones defining a region surrounding a corresponding cut feature.

11. The method of claim 10, wherein the decomposing is performed so as to reduce overlap of keep-out-zones on respective cut patterns.

12. The method of claim 10, wherein a violation of the first constraint occurs if an area of overlap of keep-out-zones from two adjacent cut features exceeds a predetermined threshold.

13. The method of claim 9, further comprising, modifying either the main pattern, the first cut pattern, or the second cut pattern in response to determining that the decomposition cannot be done without violating either the first constraint or the second constraint.

14. The method of claim 11, wherein the modifying comprises one of:

repositioning a cut feature, resizing a cut feature, reshaping a cut feature, extending an end of a main feature of the main pattern, or adding a dummy feature to the main pattern.

15. The method of claim 9, further comprising, decomposing the main pattern into a first main pattern and a second main pattern, wherein the first main pattern is associated with the first cut pattern and the second main pattern is associated with the second cut pattern.

16. The method of claim 15, wherein the decomposing is such that if a cut feature covers an end of a main feature associated with the first main pattern, then the cut feature is assigned to the second cut pattern.

17. The method of claim 9, further comprising, further decomposing the first cut pattern into a third cut pattern and a fourth cut pattern.

18. A method comprising:
receiving a target pattern;
receiving a set of constraints, the set of constraints being associated with decomposition of the target pattern into a main pattern, a first cut pattern, and a second cut pattern;
with a computing system, checking the target pattern for compliance with a first constraint of the set of constraints, the first constraint associated with the first cut pattern and not the second cut pattern;
with the computing system, checking the target pattern for compliance with a second constraint of the set of constraints, the second constraint associated with the second cut pattern and not the first cut pattern;
with the computing system, modifying the pattern to create a modified target pattern in response to determining that a violation of either the first constraint or the second constraint is found during the checking; and
fabricating an integrated circuit associated with the modified target pattern, the fabricating using a first mask associated with the first cut pattern and a second mask associated with the second cut pattern, the first mask being different than the second mask.

19. The method of claim 18, wherein the first constraint is a keep-out-zone indicating a region surrounding a cut feature in which another cut feature should not be placed.

20. The method of claim 1, wherein the first constraint is a keep-out-zone indicating a region surrounding a cut feature, wherein the cut feature should not be placed such that an end of a main feature is within a keep-out-zone associated with the cut feature.

* * * * *